Aug. 26, 1969  H. PFAFF  3,463,563
SWIVEL SUPPORT FOR GAS BEARINGS
Filed Nov. 20, 1967

INVENTOR.(S)
HELMUTH PFAFF

BY
ATTORNEYS 3,463,563
SWIVEL SUPPORT FOR GAS BEARINGS
Helmuth Pfaff, Scottsboro, Ala., assignor to the United
States of America as represented by the Administrator
of the National Aeronautics and Space Administration
Filed Nov. 20, 1967, Ser. No. 684,178
Int. Cl. F16c 7/00, 9/00, 11/00
U.S. Cl. 308—2                                    9 Claims

ABSTRACT OF THE DISCLOSURE

A spherical supporting cup for the ball of a gas bearing with the cup being capable of being swiveled to change its relative position to the ball while the bearing is under high load. This adjustability has been found to enable a substantial decrease in gas bearing "disturbance torques" caused by a lack of optimum fit between the ball and the cup due to manufacturing tolerances. A shaft is rigidly connected to the supporting cup in the center thereof and projects below the cup with the lower end of the shaft being provided with means for swivelling the shaft and thus the gas bearing supporting cup.

---

The invention described herein was made by an employee of the United States Government and may be manufactured and used by or for the Government for governmental purposes without the payment of and royalties thereon or therefor.

BACKGROUND OF THE INVENTION

This invention relates generally to gas bearings and more particularly to a swivel support for gas bearings that permits an adjustment of the relative position between the ball or a gas bearing and the supporting cup to decrease "disturbance torques" caused by necessary manufacturing tolerances.

Bearings wherein a thin film of gas is employed to minimize friction between bearing surfaces have become well known in recent years and the advantages of such bearings over any other known type of bearing have been proven for particular applications. Among the advantages afforded by gas bearings is the major one of affording a marked reduction in friction between the bearing surfaces as compared with liquid lubricated bearings. In addition to a long life, other advantages include the elimination of contamination problems caused by liquid lubricants as well as reliable operation in extreme temperatures.

While gas bearing components are necessarily manufactured under very close tolerance requirements, in certain applications and uses of these bearings problems are experienced with "disturbance torques" that are caused by necessary manufacturing tolerances. These "disturbance torques" have been experienced in circumstances where a relatively heavy load is being carried by a gas bearing and the so called "disturbance torques" apply an imbalance force on the bearing and consequently on the load carried thereby due to the imperfect distribution of air between the bearing and its supporting cup. Such imperfections in the distribution of air is, as indicated previously, due to the lack of an optimum fit between the spherical surface of the ball and the spherical supporting surface of the cup.

Experimentations and tests pursuant to the elimination or diminishment of "disturbance torques" have revealed that adjusting the relative position between the ball and its supporting cup under load conditions can establish an improved or optimum fit between the ball and its supporting cup and thus produce a greatly improved distribution of the lubricating film of gas between the bearing surfaces.

Although gas bearings with various features and refinements are known in the prior art, a satisfactory means for making very fine and precise adjustments between the relative position of the ball element and its supporting cup has not heretofore been available.

SUMMARY OF THE INVENTION

The invention comprises a supporting cup having a spherical supporting surface for receiving a ball and a system for providing a film of gas between the ball and the cup for minimizing friction between these bearing surfaces. The supporting cup is swiveled on a seat element with the abutting surfaces of the seat and the cup being spherical and concentric with the surfaces between the ball and the cup. A shaft is rigidly connected to the center of the cup and projects therebelow through an opening in the center of the seat which opening is larger in diameter than the diameter of the shaft. The end of the shaft opposite the cup is fitted with a spherical element that is mounted in an actuating mechanism that has the capability of swivelling the shaft and thus the cup in any direction up to a distance entirely adequate to establish an optimum relationship between the ball and the cup.

Accordingly, it is a general object of the present invention to provide an improved supporting device for an air bearing.

Another object of the invention is to provide a gas bearing having a bearing support for the ball of a gas bearing that is capable of being adjusted to establish an optimum fit between the ball and the support.

Another object of the invention is to provide a gas bearing having a means for decreasing gas bearing "disturbance torques" caused by manufacturing tolerances.

These and other objects and advantages of the invention will become apparent upon reference to the following specification, attendant claims and the drawing.

BRIEF DESCRIPTION OF THE DRAWING

Referring to FIGURE 1, therein is shown a ball 11 supported by a supporting cup 13 having a spherical supporting surface 15 corresponding to the spherical surface of the ball 11. The supporting cup 13 comprises two principal elements, an outer housing element 17 and an inner supporting element 19 with the latter element supported in an annular seat 21 formed in the upper portion of the housing element 17. In the center of the housing element 17 is a circular recess 23 within which fits a corresponding portion 25 depending from and integral with the supporting element 19. The vertical dimension of the portion 25 is somewhat in excess of the depth of the recess 23 to produce a space 29 between the elements 17 and 19, it being apparent that this space extends continuously around the portion 25 to form a chamber which receives gas through a passage 33 and a line 35 from a suitable source (not shown).

Figure 1:
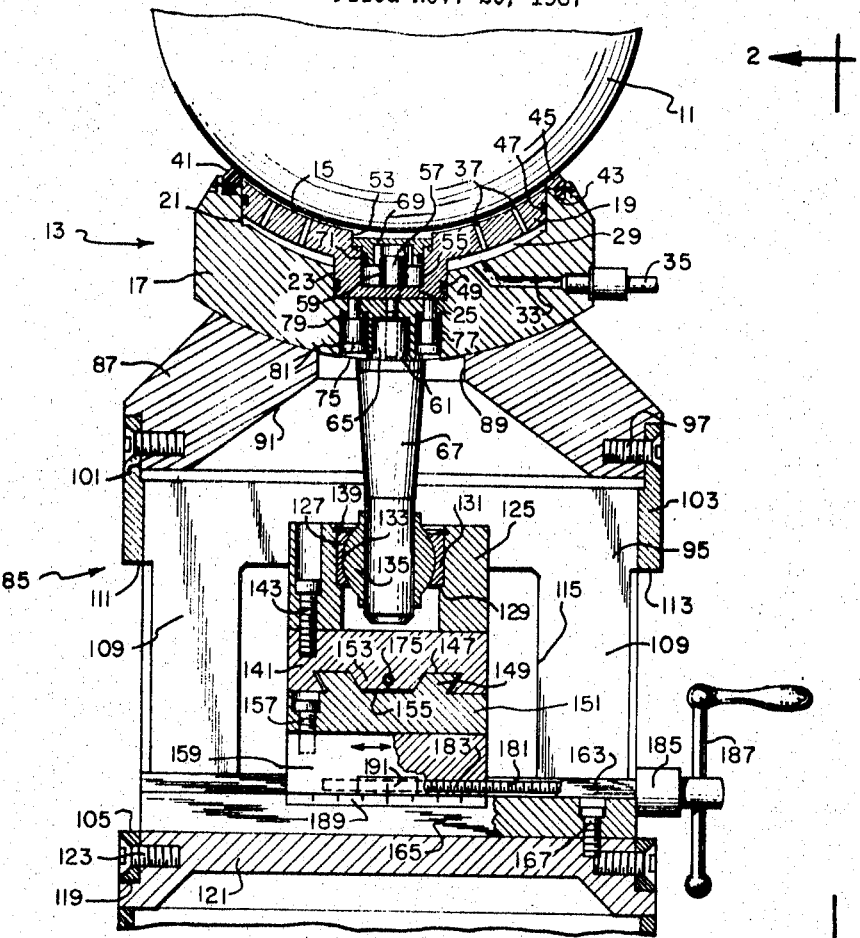
FIGURE 1 is a cross sectional view of a gas bearing embodying the swivel supporting cup of the present invention.

A series of gas passage orifices 37 formed in the supporting element 19 permit the passage of gas from the chamber 29 to form a lubricating film of air between the ball 11 and the supporting cup 13. A plastic support ring 41 is mounted on the upper surface of the housing element 17 within a groove 43 and the support ring 41 has a spherical surface 45 that corresponds to the surface of the ball 11. Sealing gaskets or rings 47 and 49 are provided in the upper and lower portions, respectively, of the supporting element 19.

A central recess 53 is provided in the supporting element 19 having a reduced diameter portion 55. Disposed in the recessed portion 55 is a bolt 57 equipped with a tension spring 59 which bolt extends through the lower portion of the supporting element 19 and into a socket 61 in the lower surface of the housing element 17 and also threads into a dowel portion 65 of a downwardly extending shaft 67. The bolt is covered at its upper end by a plug 69 that fits into the large diameter portion of the recess 53, this plug being equipped with a sealing ring 71. A further connection between the supporting elements 17 and 19 is effected by a plurality of bolts 75 joined to the bottom of the portion 25 of the element 19. The bolts 75 pass through countersunk holes 77 in the bottom of the housing element 17 so that each of the holes 77 has a shoulder portion 79. Between the heads of the respective bolts 75 and the shoulders 79 are compressed tension springs 81. These tension springs permit the cup supporting element 19 to raise slightly under the pressure of gas introduced into the chamber 29.

The bottom surface of the housing element 17 is spherical and is connected with the spherical surface of the ball 11. The housing element 17 is seated on a hollow pedestal 85 having an upper seat 87 with a spherical seating surface that corresponds to the bottom spherical surface of the housing element 17. In the center of the seat 87 is a hole 89 through which passes the shaft 67 with the hole 89 being appreciably larger in diameter than the diameter of the shaft 67. Merging with the hole 89 is a conical recess 91.

The seat 87 is four-sided and is joined to a four-sided unit 95 of the pedestal 85 by screws 97, the upper part of the unit 95 fitting into a peripheral groove 101 in the seat 87. The unit 95 is an integral four-sided unit comprising an upper portion 103 and a lower portion 105 united by struts 109 such that two opposed sides of the unit 95 has openings 111 and 113 therein and the remaining opposed sides has openings 115 and 117 therein. The lower portion 105 of the unit 95 fits in a groove 119 of a base plate 121 and is secured to the base plate 121 by screws 123.

The means for swivelling the shaft 67 and thus the supporting cup 13 is installed in the central region of the unit 95 and comprises a shaft receiving block 125 that has a central hole 127 therethrough of changing diameter to form a shoulder 129. Supported over the shoulder 129 is a seat element 131 having a spherical cavity 133 therein that receives a spherical bearing 135 which is fixed on the shaft 67. The seat element 131 is maintained in the opening 127 by a retainer ring 139.

Figure 2:
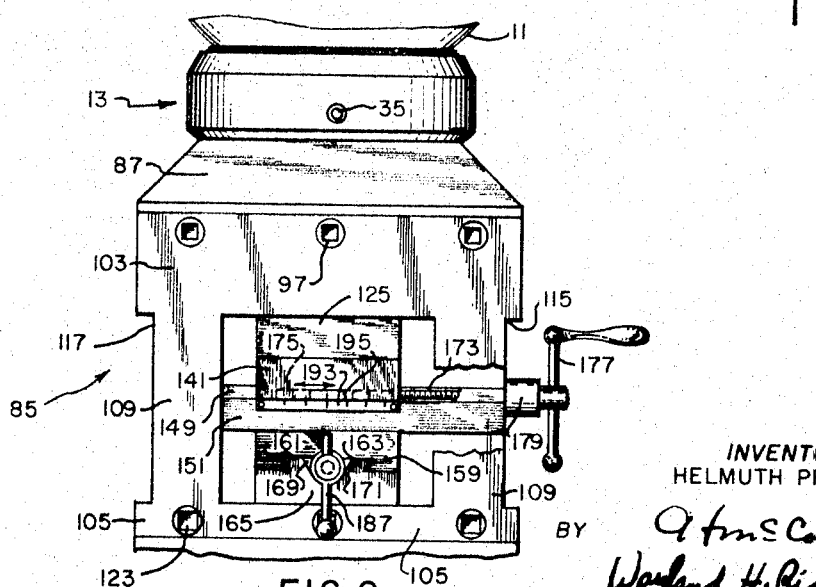
FIGURE 2 is an elevational view, partially broken away, taken along line 2—2 of FIGURE 1.

The shaft receiving block 125 is mounted by countersunk screws 143 on an actuating mechanism that includes a sliding block 141. The sliding block 141 has a dovetail groove 147 throughout its length that receives a dovetail projection 149 of a rail 151. The sliding block 141 also has a central rib 153 that slides within a central groove 155 in the dovetail projection 149. The rail 151 extends the width of the pedestal 85 and is joined by countersunk screws 157 to a second slidable block 159 that has a dovetail groove 161 therein (see FIGURE 2) that runs in a direction perpendicular to the dovetail groove 147 in the slidable block 141. The dovetail groove 161 receives a dovetail projection 163 of a bottom rail 165 that extends across the pedestal 85 and is connected to the base plate 121 by countersunk screws 167. The sliding block 159 likewise has a central rib 169 (FIGURE 2) that slides within a central groove 171 in the dovetail projection 163.

The slidable block 141 may be moved back and forth in the direction of the arrows (FIGURE 2) by a crank screw 173 that is threaded into a threaded hole 175 in the central rib 153 of the sliding bar 141. The crank screw is provided with a handle 177 and is restricted to rotational movement in a journal 179 secured as by screws or welding to the end of the rail 151.

The sliding block 159 may be moved back and forth in the direction indicated by the arrows (FIGURE 1) by a crank screw 181 that is threaded into a threaded hole 183 in the central rib 169 of the sliding block 159. The crank screw 181 is journalled for rotational movement only in a journal 185 mounted on the end of the bottom rail 165 and the crank screw is fitted with a handle 187.

It is evident that when the sliding block 141 is moved left or right as indicated by the arrows (FIGURE 2) the shaft 67 will be moved with the block 141. When the sliding block 159 is moved left or right as indicated by the arrows (FIGURE 1) the shaft 67 will move with the block 159, and the block 141 and the rail 151 will also move with the block 159 since the rail 151 is connected by screws 157 to block 159.

Thus by turning one or both of the crank screws 173 and 181 the supporting cup 13 may be swiveled on the seat 87 of the pedestal 85 to any position within the zone defined by the conical recess 91. The spherical bearing 135 rotates freely within the seat element 131 when the shaft is being swiveled by turning either of the crank screws 173 or 181. A scale 189 may be provided on the rail 165 and an indicator 191 provided on the sliding bar 159 so that the optimum position of the sliding bar can be read and recorded for any particular operation. A similar scale 193 and indicator 195 may be provided on the rail 151 and sliding bar 141, respectively.

It is apparent from the foregoing that the present invention provides a gas bearing support that may be precisely adjusted under load conditions by changing the relative position between the supporting cup and the ball supported thereby to diminish or decrease "disturbance torques" caused by imperfect fits between the bearing and its support.

Obviously, many modifications and variations of the present invention are possible in the light of the above teachings. it is, therefore, to be understood that within the scope of the attendant claims the invention may be practiced other than as specifically described.

I claim:
1. A gas bearing comprising:
 (a) a supporting cup having a spherical supporting surface;
 (b) a ball having the spherical surface thereof overlying and contiguous with said spherical supporting surface of said cup;
 (c) means including a series of holes through said cup for supplying a thin film of gas between said contiguous spherical surface of said ball and said cup;
 (d) swivelling means connecting said cup to adjusting means whereby said spherical supporting surface of said cup may be adjusted relative to the surface of said ball to produce an improved fit between said contiguous surfaces; and
 (e) means securing said cup in an adjusted position relative to said ball.

2. The invention as defined in claim 1 wherein said swivelling means includes a shaft joined to and projecting from said cup on the side thereof opposite said ball, an actuating mechanism disposed in alignment with said shaft said shaft being connected through a universal joint to said actuating mechanism.

3. The invention as defined in claim 2 including a pedestal having an interior cavity, said cup bearing on said pedestal, said actuating mechanism being disposed in said cavity.

4. The invention as defined in claim 2 wherein said connection between said shaft and said actuating mechanism includes a spherical bearing fixed to said shaft, a bearing seat receiving said spherical bearing, means joining said bearing seat to said actuating mechanism.

5. The invention as defined in claim 2 wherein said actuating mechanism includes a sliding block and a rail said block being slidably mounted on said rail, means for producing sliding motion of said block over said rail.

6. The invention as defined in claim 5 wherein said means for producing sliding motion includes a crank screw, said crank screw threadedly engaging said block.

7. The invention as defined in claim 2 wherein said actuating mechanism includes a first sliding block and a first rail, said first sliding block being slidably mounted on said first rail, a second rail mounted on and joined to said first sliding block, a second sliding block slidably mounted on said second rail, said first rail and said first sliding block being disposed at right angles to said second rail and said second block whereby said first sliding block is slidable back and forth at right angles to the sliding movement of said second sliding block.

8. The invention as defined in claim 1 including a pedestal supporting said cup; said pedestal comprising a seat element having a spherical supporting surface concentric with the spherical surface of said ball, said cup having a second spherical surface opposite said surface thereof contiguous with said ball, said second spherical surface of said cup fitted to and bearing on said supporting surface of said seat element.

9. The invention as defined in claim 8 wherein said seat element has an opening through the center thereof, said swivelling means including a shaft joined to and projecting from said cup, said shaft extending through said opening in said seat element, the diameter of said opening substantially exceeding the diameter of said shaft whereby said shaft may swivel within said opening.

References Cited

UNITED STATES PATENTS

| | | | |
|---|---|---|---|
| 1,098,023 | 5/1914 | Deister. | |
| 1,499,602 | 7/1924 | Bibbins. | |
| 2,397,300 | 3/1946 | Tilton | 308—3 |
| 3,137,531 | 6/1964 | Herrmann | 308—9 |
| 3,155,438 | 11/1964 | Ruegg | 308—72 |
| 3,233,949 | 2/1966 | Rieman. | |
| 3,308,848 | 3/1967 | Johnson | 308—9 X |

MARTIN P. SCHWADRON, Primary Examiner

L. L. JOHNSON, Assistant Examiner

U.S. Cl. X.R.

308—9, 61